United States Patent Office 3,308,762
Patented Mar. 14, 1967

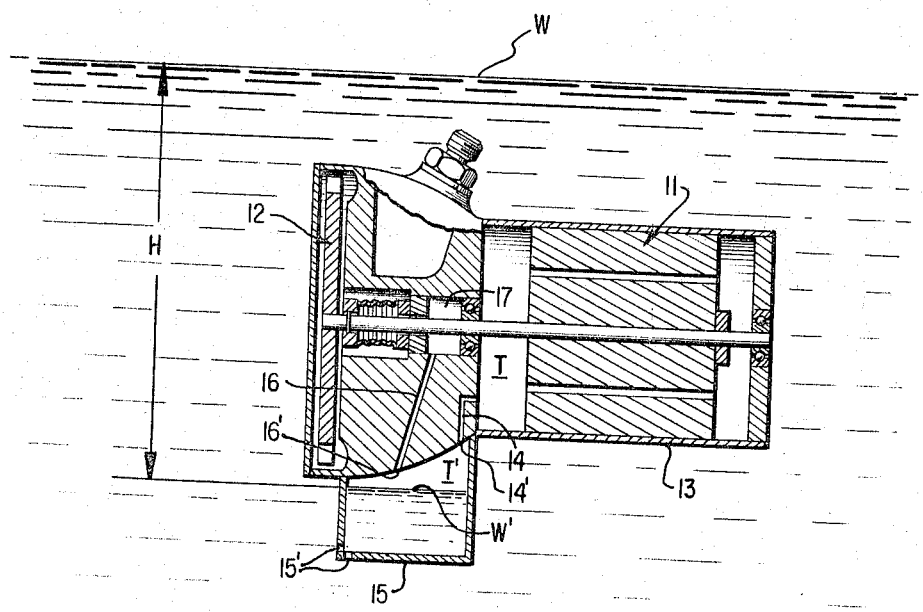
INVENTOR
LUDWIG FRICKER
BY Dicke & Craig
ATTORNEYS.

3,308,762
MOTOR ASSEMBLY
Ludwig Fricker, Stuttgart-Feuerbach, Germany, assignor to Daimler-Benz Aktiengesellschaft, Stuttgart-Unterturkheim, Germany
Filed Apr. 27, 1965, Ser. No. 451,269
Claims priority, application Germany, Apr. 28, 1964, D 44,286
10 Claims. (Cl. 103—87)

The present invention relates to a motor assembly and more particularly to an installation preventing water from entering into the interior space of the housing of electrical motors used for driving feed pumps of motor vehicles.

It is known in the motor vehicle manufacture to drive the fuel feed pump, which is built as a gear or rotary pump, by means of an electric motor, the assembly housing of which is attached to the fuel feed pump housing, whereby the pump shaft and the motor shaft extend coaxially For charging or ventilating and airing the interior space of the electric motor-assembly housing, a line or channel leads to the outside thereof in these prior art constructions. Furthermore, a drain passage leading to the outside is provided in the feed pump housing for the leakage fuel which seeps from the pump pressure space through the seal into the leakage space whereby the inner shaft bearing, for instance, a ball bearing is arranged between the leakage space and the interior space of the electric motor-assembly housing.

Under certain operating conditions, the following difficulties are encountered: As soon as the feed pump aggregate, warmed up to its operating temperature, is submerged in water as, for example, when driving through river fords at higher water level or when driving over flooded roads, the air within the inner space of the motor assembly housing is cooled off and the volume thereof is reduced thereby so that the harmful water enters the interior space for such a length of time until pressure equilibrium between the pressure of the inside air and the existing water column is reached. Also, the possibility to close up the charge and vent opening for the motor assembly space does not bring about the desired success inasmuch as the pressure equalization between the enclosed air and the existing water column takes place through the drain passage for the leakage fuel and through the inner shaft bearing so that also in this manner, water will enter the motor assembly space.

The invention aims at preventing, under given circumstances, water from entering into the assembly space for the electric motor.

As solution to the problem, it is suggested according to the present invention to arrange an ante-chamber in direct communication with the atmosphere or outside air ahead of the outer outlet or mouth of the charge and vent line which leads from the interior space of the motor assembly housing to the outside, which ante-chamber also includes the outer outlet or mouth of the leakage fuel-drain passage, provided there is no special seal arranged between the leakage space and the motor assembly space, whereby the ante-chamber is of such size, that is, includes such an air volume, that the desired pressure equalization between the air in the ante-chamber and the motor assembly space and the existing water column is reached already ahead of the interior space of the motor assembly housing.

Preferably, the connection with the free outer or atmospheric air is brought about by an opening located at the lowest point of the ante-chamber.

Accordingly, it is an object of the present invention to provide an assembly of the type described above which effectively eliminates the aforementioned shortcomings encountered with the prior art constructions.

Another object of the present invention resides in the provision of a housing for electrical machines, particularly for electric motors driving feed pumps of internal combustion engines, which is so constructed and arranged as to prevent water from entering into the interior space of the housing under all normally expected driving conditions.

A further object of the present invention resides in the provision of an electric motor-feed pump assembly which eliminates the possibility that harmful water may enter into the interior space of the motor housing through the venting line, yet is simple in construction and easy to assemble.

Another object of the present invention resides in the provision of an electric motor-feed pump assembly in which no special seals are necessary between the pump and the electric motor sections, yet a penetration of water from the outside through the venting and/or fuel leakage channel are prevented under all normally occurring operating conditions.

These and further objects, features, and advantages of the present invention as well as the mode of operation thereof will become more obvious from the following description when taken in connection with the accompanying drawing which shows, for purposes of illustration only, one embodiment in accordance with the present invention and wherein:

The single figure is a somewhat schematic cross-sectional view through a feed pump aggregate including the feed pump and driving motor in accordance with the present invention.

Referring now more particularly to the single figure of the drawing, the electric motor generally designated therein by reference numeral 11 for driving the fuel feed pump generally designated by reference numeral 12 and in the form of a rotary pump is arranged within an assembly housing 13, the interior space T of which, filled with air, is charged and vented by means of a line 14, the outer mouth or outlet orifice 14' of which opens into the interior space T' of an ante-chamber 15 which is in communication with the free outside or atmospheric air by means of orifices 15'. The ante-chamber 15 further surrounds the outer mouth or outlet orifice 16' of a drain passage 16 for the leakage fuel which collects in the leakage or drain space 17.

Operation

The mode of operation is as follows: As soon as the fuel feed pump aggregate 11, 12 is submerged in water, for instance, in a water level W, the air in the interior space T which was previously heated by the motor 11, is cooled off whereby its volume is decreased. The result thereof is that water flows into the ante-chamber 15 through the orifice 15', and more particularly for such a length of time, until equilibrium between the pressure of the enclosed air in spaces T and T' and the existing water pressure is restored which water pressure is determined by the height H between W' and W. The ante-chamber 15 must assume such a size or include such a large volume that in the submerged condition of the feed pump aggregate, the water entering the ante-chamber 15 through orifice 15' does not reach the interior space T, that is, that the aforementioned equilibrium establishes itself still prior to the penetration of water into the interior space T; in other words, the larger the water column H, the larger must also be dimensioned the ante-volume T' or ante-chamber 15.

After the emerging of the fuel feed aggregate out of the water, the water in the ante-chamber 15 is shaken out into the atmosphere through the openings 15'. Also, the leakage fuel drips through these openings 15'.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:
1. An installation preventing water from penetrating into the interior space of the assembly housing of electrical machines, especially of electric motors for driving feed pumps, particularly fuel feed pumps, comprising:
   electric motor means including a substantially closed housing means,
   relatively small vent line means for venting the interior space of said electric motor housing means and provided with relatively small outer orifice means,
   the orifice means of said vent line means pointing substantially in the downward direction,
   a substantially closed second housing means forming ante-chamber means located below said orifice means and having relatively small second orifice means vertically spaced a substantial distance below said vent line orifice means for providing the only direct communication with the atmosphere, said ante-chamber means being of such size that the desired pressure equalization between the air present within the space of the ante-chamber means, on the one hand, and of the occurring water columns, on the other, is reacted still ahead of the interior space of the motor housing means.

2. The device according to claim 1, wherein said second orifice means is located at the lowermost point of said ante-chamber means.

3. An installation preventing water from penetrating into the interior space of the assembly housing of electrical machines, especially of electric motors for driving feed pumps, particularly fuel feed pumps, comprising:
   fuel feed pump means including housing means and provided with a leakage space,
   electric motor means for driving said fuel feed pump means including housing means,
   said housing means effectively forming a unitary structure,
   vent line means for venting the interior space of said electric motor housing means and provided with outer orifice means,
   leakage line means provided with outer orifice means and providing a communication between the leakage space of said fuel feed pump means and the atmosphere,
   the orifice means of said vent line means pointing substantially in the downward direction,
   ante-chamber means located below said orifice means and in direct communication with the atmosphere, said ante-chamber means being of such size that the desired pressure equalization between the air present within the space of the ante-chamber means and the motor housing means, on the one hand, and of the occurring water column, on the other, is reached still ahead of the interior space of the motor housing means.

4. An installation preventing water from penetrating into the interior space of the assembly housing of electrical machines, especially of electric motors for driving feed pumps, particularly fuel feed pumps, comprising:
   fuel feed pump means including housing means and provided with a leakage space,
   electric motor means for driving said fuel feed pump means including housing means,
   said housing means effectively forming a unitary structure,
   vent line means for venting the interior space of said electric motor housing means and provided with outer orifice means,
   leakage line means provided with outer orifice means and providing a communication between the leakage space of said fuel feed pump means and the atmosphere,
   the orifice means of said vent line means pointing substantially in the downward direction,
   ante-chamber means located below said orifice means and in direct communication with the atmosphere, said ante-chamber means being of such size that the desired pressure equalization between the air present within the space of the ante-chamber means and the motor housing means, on the one hand, and of the occurring water column, on the other, is reached still ahead of the interior space of the motor housing means,
   the leakage space of said pump housing means and the interior space of the motor housing means being devoid of any special seal disposed therebetween, and further ante-chamber means in communication with the atmosphere and located ahead of the outer orifice means of said leakage line means.

5. An installation preventing water from penetrating into the interior space of the assembly housing of electrical machines, especially of electric motors for dividing feed pumps, particularly fuel feed pumps, comprising:
   fuel feed pump means including housing means and provided with a leakage space,
   electric motor means for driving said fuel feed pump means including housing means,
   said housing means effectively forming a unitary structure,
   vent line means for venting the interior space of said electric motor housing means and provided with outer orifice means,
   leakage line means provided with outer orifice means and providing a communication between the leakage space of said fuel feed pump means and the atmosphere,
   the orifice means of said vent line means pointing substantially in the downward direction,
   ante-chamber means located below said orifice means and in direct communication with the atmosphere, said ante-chamber means being of such size that the desired pressure equalization between the air present within the space of the ante-chamber means and the motor housing means, on the one hand, and of the occurring water column, on the other, is reached still ahead of the interior space of the motor housing means,
   the leakage space of said pump housing means and the interior space of the motor housing means being devoid of any special seal disposed therebetween, and further ante-chamber means in communication with the atmosphere and located ahead of the outer orifice means of said leakage line means,
   said first and second ante-chamber means being a common ante-chamber structure.

6. An installation preventing water from penetrating into the interior space of the assembly housing of electrical machines, especially of electric motors for driving feed pumps, particularly fuel feed pumps, comprising:
   fuel feed pump means including housing means and provided with a leakage space,
   electric motor means for driving said fuel feed pump means including housing means,
   said housing means effectively forming a unitary structure,
   vent line means for venting the interior space of said electric motor housing means and provided with outer orifice means,
   leakage line means provided with outer orifice means and providing a communication between the leakage space of said fuel feed pump means and the atmosphere, the orifice means of said vent line means pointing substantially in the downward direction, ante-chamber means located below said orifice means and in direct communication with the atmosphere, said ante-chamber means being of such size that the desired pressure equalization between the air present within the space of the ante-chamber means and the motor housing means, on the one hand, and of the occurring water column, on the other, is reached still ahead of the interior space of the motor housing means, said ante-chamber means being provided with aperture means leading toward the outside and located at the lowest place of said ante-chamber means, the leakage space of said pump housing means and the interior space of the motor housing means being devoid of any special seal disposed therebetween, and further ante-chamber means in communication with the atmosphere and located ahead of the outer orifice means of said leakage line means, said first and second ante-chamber means being a common ante-chamber structure.

7. An electric machine assembly preventing the penetration of water into the interior space of the housing thereof, especially of electric motors, comprising:

an electric machine assembly including a substantially closed housing means provided with an interior space, relatively small vent line means for venting the interior space of said housing means, and terminating in relatively small outer orifice means open substantially in the downward direction, and a substantially closed second housing means forming ante-chamber means having relatively small second orifice means vertically spaced a substantial distance from said vent line means outlet orifice to form the only direct communication with the atmosphere, and of such size that the desired pressure equalization between the air present within the space of the ante-chamber means and the housing means, on the one hand, and of the occurring water column normally expected to occur, on the other, is attained prior to water reaching the interior space of the housing means.

8. A pump and electric motor housing assembly preventing the penetration of water into the interior space of the housing of the electric motor for driving the pump, comprising:

pump means, electric motor means for driving said pump means, housing means for said pump and motor means and providing a leakage space in said pump means and an interior space in said electric motor means, vent line means for venting the interior space of said electric motor means and provided with outer orifice means, leakage line means providing a communication between the leakage space and the atmosphere and provided with outer orifice means, at least some of said orifice means pointing substantially in the downward direction, and ante-chamber means located below said orifice means and of such size that the desired pressure equalization between the air present within the space of the ante-chamber means and the motor housing means, on the one hand, and of the occurring water column, on the other, is reached prior to the water reaching the interior space of the motor housing means.

9. A vented motor-pump combination for pumping a first fluid and preventing contact between a separate liquid through the motor vent when the combination is immersed in the separate liquid, comprising pump means for pumping the first fluid and having a substantially closed first housing provided with a pump working chamber; electric motor means for driving said pump means; substantially closed second housing means enclosing said motor means and sealing said motor means from fluid communication with said pump means working chamber; said second housing means having relatively small outlet orifice means to vent said motor means to the atmosphere and provide a drain opening; said outlet orifice means being located in the lowermost portion of said second housing means and being vertically spaced a substantial distance below the lowermost portion of said motor means to form with said second housing means a chamber of such a size that the pressure within said second housing means chamber equals the pressure of the separate liquid when said second housing means is immersed in the separate liquid, before the level of the separate liquid entering said outlet orifice means reaches any part of said motor means.

10. The device of claim 9, wherein said second housing means includes first fluid leakage line means for collecting the leakage from said pump before it reaches said motor means and conducting the first fluid leakage to said second housing means chamber.

References Cited by the Examiner

UNITED STATES PATENTS 1,355,755 10/1920 Drysdale et al. _____ 103—87
1,929,754 10/1933 McCord _____ 103—87

ROBERT M. WALKER, Primary Examiner.